United States Patent
Hood et al.

(10) Patent No.: US 6,813,544 B2
(45) Date of Patent: Nov. 2, 2004

(54) METHOD AND APPARATUS FOR SPATIALLY VARIABLE RATE APPLICATION OF AGRICULTURAL CHEMICALS BASED ON REMOTELY SENSED VEGETATION DATA

(75) Inventors: Kenneth Brown Hood, Gunnison, MS (US); Michael R. Seal, Picayune, MS (US); Mark David Lewis, Long Beach, MS (US); James William Johnson, Slidell, LA (US)

(73) Assignee: Institute of Technology Development, Jackson, MS (US)

( * ) Notice: Subject to any disclaimer, the term of this patent is extended or adjusted under 35 U.S.C. 154(b) by 0 days.

(21) Appl. No.: 10/222,898

(22) Filed: Aug. 19, 2002

(65) Prior Publication Data

US 2004/0034450 A1 Feb. 19, 2004

(51) Int. Cl.[7] .............................................. G05D 11/02
(52) U.S. Cl. ........................... 700/284; 702/5; 382/110
(58) Field of Search ................................ 700/287, 284; 702/5; 706/928; 382/110; 701/50; 111/118; 47/48.5

(56) References Cited

U.S. PATENT DOCUMENTS

| | | | |
|---|---|---|---|
| 5,220,876 A | 6/1993 | Monson et al. ............. 111/130 |
| 5,334,987 A | 8/1994 | Teach ......................... 342/357 |
| 5,467,271 A | * 11/1995 | Abel et al. ....................... 702/5 |
| 5,689,418 A | * 11/1997 | Monson ....................... 706/928 |
| 5,704,546 A | 1/1998 | Henderson et al. ............. 239/1 |
| 5,878,371 A | 3/1999 | Hale et al. ....................... 702/5 |
| 5,913,915 A | 6/1999 | McQuinn ..................... 701/50 |
| 5,919,242 A | 7/1999 | Greatline et al. ............. 701/50 |
| 5,938,709 A | 8/1999 | Hale et al. ..................... 701/50 |
| 5,995,895 A | 11/1999 | Watt et al. ..................... 701/50 |
| 6,108,590 A | 8/2000 | Hergert ....................... 700/284 |
| 6,141,614 A | 10/2000 | Janzen et al. .................. 701/50 |
| 6,160,902 A | 12/2000 | Dickson et al. ............. 382/110 |
| 6,178,253 B1 | * 1/2001 | Hendrickson et al. ...... 382/110 |
| 6,199,000 B1 | 3/2001 | Keller et al. .................. 701/50 |
| 6,236,907 B1 | 5/2001 | Hauwiller et al. .......... 700/283 |
| 6,336,066 B1 | 1/2002 | Pellenc et al. ................ 701/50 |
| RE37,574 E | 3/2002 | Rawlins ......................... 702/2 |
| 6,366,681 B1 | 4/2002 | Hutchins ..................... 382/110 |
| 6,466,321 B1 | 10/2002 | Satake et al. ................ 356/402 |
| 6,522,948 B1 | 2/2003 | Benneweis ................... 700/243 |
| 6,549,851 B2 | 4/2003 | Greensides .................... 702/2 |
| 6,596,996 B1 | * 7/2003 | Stone et al. ............. 250/358.1 |
| 6,597,991 B1 | 7/2003 | Meron et al. ................... 702/3 |
| 6,678,580 B2 | 1/2004 | Benneweis ................... 700/237 |
| 6,683,970 B1 | 1/2004 | Satake et al. ................ 382/110 |
| 6,708,080 B2 | 3/2004 | Benneweis ................... 700/242 |

FOREIGN PATENT DOCUMENTS

| | | |
|---|---|---|
| DE | 21 11 843 | 9/1972 |
| EP | 0 149 417 | 7/1985 |
| EP | 0 378 066 | 7/1990 |
| WO | WO 98 06591 | 2/1998 |

* cited by examiner

Primary Examiner—Albert W. Paladini
(74) Attorney, Agent, or Firm—Crowell & Moring LLP

(57) ABSTRACT

Remotely sensed spectral image data are used to develop a Vegetation Index file which represents spatial variations of actual crop vigor throughout a field that is under cultivation. The latter information is processed to place it in a format that can be used by farm personnel to correlate and calibrate it with actually observed crop conditions existing at control points within the field. Based on the results, farm personnel formulate a prescription request, which is forwarded via email or FTP to a central processing site, where the prescription is prepared. The latter is returned via email or FTP to on-side farm personnel, who can load it into a controller on a spray rig that directly applies inputs to the field at a spatially variable rate.

11 Claims, 9 Drawing Sheets

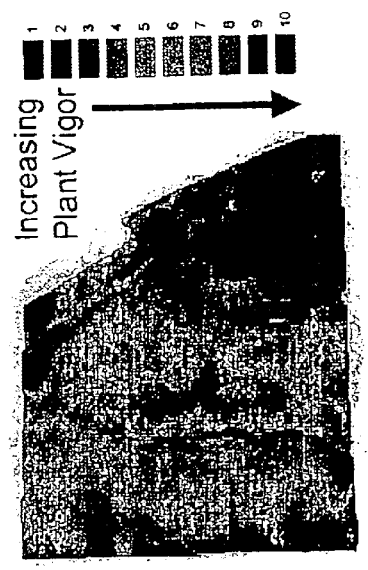
FIG. 5a Spectral Composite Image
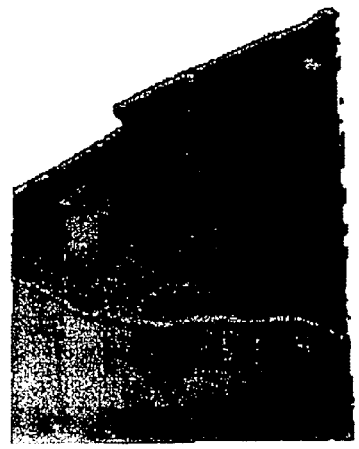
FIG. 5b Scout Map
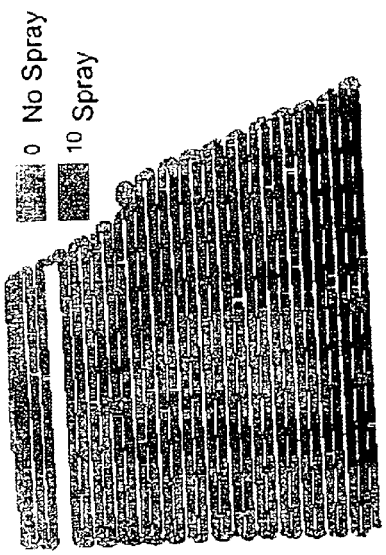
FIG. 5c Prescription Map
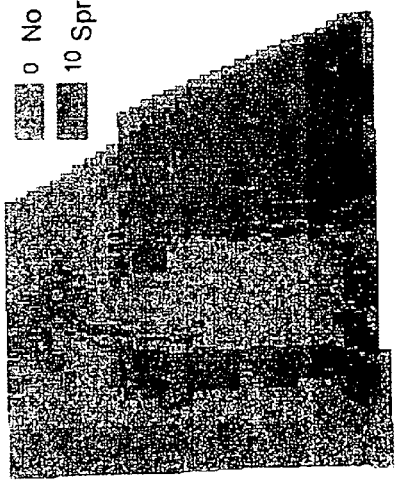
FIG. 5d As-Applied Map

METHOD AND APPARATUS FOR SPATIALLY VARIABLE RATE APPLICATION OF AGRICULTURAL CHEMICALS BASED ON REMOTELY SENSED VEGETATION DATA

The U.S. Government has a paid-up license in this invention and the right in limited circumstances to require the patent owner to license others on reasonable terms as provided for by the terms of Specific Cooperative Agreement Grant No. NCC13-0001 awarded by the National Aeronautics and Space Administration ("NASA").

BACKGROUND OF THE INVENTION

The present invention is directed to a method and apparatus for promoting uniform healthy development of a growing crop by providing a variable rate application of agricultural chemicals, including fertilizer and pesticides, such as insecticides, fungicides and herbicides, to a cultivated field. In particular, the invention provides a method for achieving optimized crop development using a minimum necessary amount of agricultural chemicals, adapted specifically to spatial variations in crop vigor.

Systems for variable rate application of fertilizer to a field which is under cultivation are known. For example, U.S. Pat. No. 5,220,876 discloses a variable rate fertilizer spreading apparatus that uses a soil map, (which may be acquired, for example, from an aerial infrared photograph), in order to determine the amount of fertilizer that is to be applied at each location within the field. For this purpose, a map is prepared (referred to as a "fertilizer map"), which shows a spatially distributed desired fertilizer level throughout the field, as well as a "status" map which shows corresponding existing fertilizer distribution throughout the field. The desired distribution of fertilizer as recorded in the "fertilizer map" is prepared in advance, based on determined physical characteristics of the field itself, including field topography, soil type, drainage, sun exposure, and the like. In order to provide for application of the proper amount of fertilizer to achieve the desired distribution, an "Expert System" utilizes artificial intelligence to perform the necessary calculations, based on the fertilizer map, the status map, the soil type and the types of chemicals that are being applied.

In a prescription forming control system disclosed in U.S. Pat. No. 5,919,242, a navigation controller controls the delivery rate of agricultural products by an applicator vehicle, as a function of the global position of the vehicle, based on digital maps which divide a field into "zones", according for example to soil types. Several different products are delivered at differing rates depending on the soil content and the types of crops that are being cultivated. Similarly, U.S. Pat. No. 5,913,915 also discloses a multi-variable dispensing rate applicator for agricultural products in which a computerized control system stores a digital soil map containing information concerning the location of types of soils, topographic features, nutrient levels, soil compaction, drainage and the like. A map coordinate system allows for variable input control from side to side relative to the movement of the applicator system.

U.S. Pat. No. 6,199,000 B1 provides a precision farming method in which seeding, cultivating and/or harvesting operations are controlled using GPS technology in conjunction with a digital map of an agricultural field, which may be created using satellite, aircraft or other overhead imagery. High resolution photographs acquired in this manner are used to generate the digital map. According to this disclosure, relevant information can then be stored in the map (location of irrigation systems, previous planting locations of other crops and the like), and used to determine, for example, the location at which new crops/seeds should be planted.

Similar systems, in which soil characteristic maps are used to control automated agricultural machines are disclosed in U.S. Pat. Nos. 6,236,907 B1; 6,336,066 B1 and 6,141,614.

Each of the above prior art systems is based on the premise that the likely development of a crop planted in a particular field (and therefore the amount of nutrients which should be added in order to achieve optimum plant growth) can be calculated based on physical soil and field conditions, such as the type of soil, topography, drainage, existing nutrient levels, compaction, etc. Accordingly, such information concerning soil and field conditions is stored in the form of a map or maps, which are then used to determine an optimum distribution of fertilizer or the like, based on complex, in some cases proprietary, algorithms. (See, for example, U.S. Pat. No. 5,220,876 at Column 8, lines 58 et seq.)

Such systems share the common deficiency that they reflect only the soil and other physical field characteristics, and in some instances the type of crop being cultivated. While these may be reasonable prognosticators of likely crop development, they do not and cannot take into account or adjust for actual crop growth due, for example, to the effects of weather, diseases, insects and the like. Nor can they take into account the effects of weather on the materials themselves after they have been applied—such as for example due to heavy rains and attendant runoff. They are also generally incapable of generating time variable dynamic crop prescriptions based on actual crop development throughout the growing season.

Accordingly, it is an object of the present invention to provide a method and apparatus for controlling a spatially variable rate delivery apparatus for applying agricultural chemicals to a growing crop in a cultivated field which dynamically takes into account actual crop development throughout the growing season. (As used herein, the term "spatially variable rate" means that the rate at which agricultural chemicals are applied varies as a function of geographic position, and includes so called "on/off" systems, in which application is varied between zero ("off") and a fixed application rate ("on"), depending on position.)

Another object of the invention is to provide such a method and apparatus for controlling application rates for agricultural chemicals, which automatically takes into account the effects of weather, disease and insects on crop development.

Another object of the invention is to provide such a system which is responsive to the effects of weather on the agricultural chemicals themselves, after they have been applied.

Yet another object of the invention is to provide a system that can be used to control application rates for pesticides, including herbicides, insecticides and fungicides, in addition to fertilizers.

Still a further object of the invention is to provide a system that can be correlated with ground truth information for accurate decision making.

Another object of the invention is to eliminate the necessity of storing large volumes of soil status information in the form of multilayer maps, as well as the need for complex calculations based on such maps. (It is of course apparent that such additional "layers" of information may prove useful, and may therefore be used optionally.)

These and other objects and advantages are achieved by the method and apparatus according to the invention, in which remotely sensed spectral image data are used to develop a Vegetation Index image that represents spatial variations of actual crop vigor throughout a field that is under cultivation. Such a Vegetation Index may, for example, be a conventional "Normalized Difference Vegetation Index", or any other band combination which yields spatially resolved information regarding the vigor of existing vegetation. Moreover, as used herein, the term "spectral image data" encompasses all types of spectrally resolved image data, including data sets that are conventionally referred to as "multispectral" and "hyperspectral" imagery, as well as any equivalent spectrally resolved image data.

The latter information is processed to place it in a format that can be used by farm personnel to correlate and calibrate it with actually observed crop conditions existing at control points within the field. Based on the results, farm personnel formulate a prescription request, which is forwarded via email (or other communications medium) to a central processing site, where the prescription is prepared. The latter is returned via email (or other medium) to on site farm personnel, who can load it into a controller on a spray rig that directly applies inputs to the field.

Other objects, advantages and novel features of the present invention will become apparent from the following detailed description of the invention when considered in conjunction with the accompanying drawings.

BRIEF DESCRIPTION OF THE DRAWINGS

FIGS. 5a–d show examples of data files generated according to the invention.

DETAILED DESCRIPTION OF THE DRAWINGS

Figure 1:
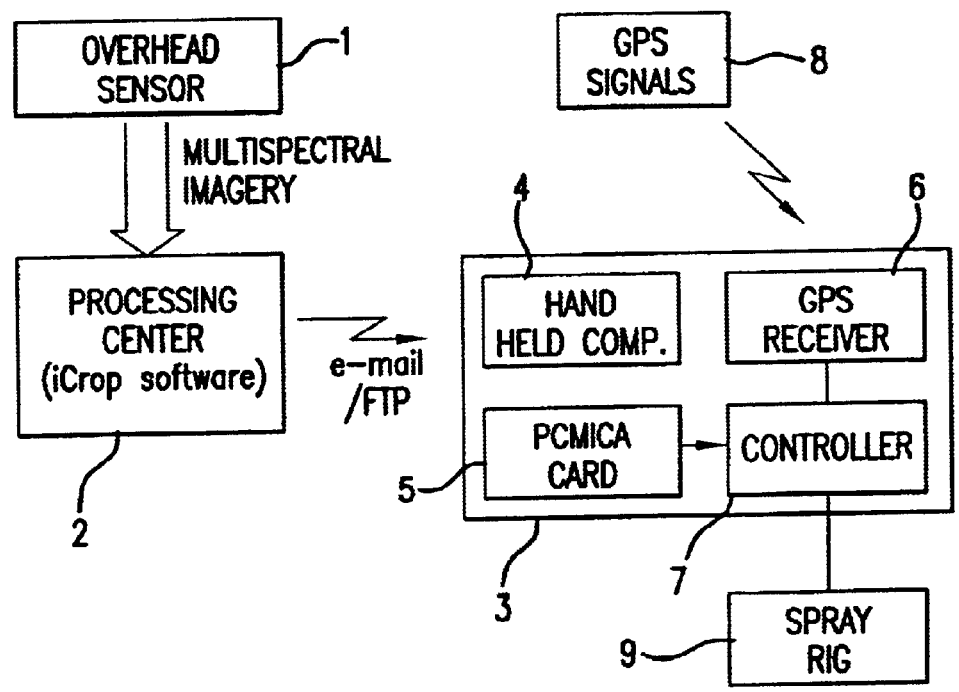
FIG. 1 is a conceptual schematic illustration of the components of a variable rate system for applying nutrients and agricultural chemicals to a cultivated field according to the invention.

FIG. 1 shows the principal components of the variable rate delivery system according to the invention. It includes an overhead sensor 1 that acquires digital spectral image data. (The overhead sensor may be for example a satellite or airborne remote sensing system.) These spectral image data are forwarded to a processing center 2, where they are processed into a form that can be used by on site farm personnel, and where prescriptions are prepared in response to prescription requests received from farm personnel, all as described in more detail below.

On site at the farm 3, a hand held computer 4 is used to receive processed data from the processing center 2 and to enter and process the results of an actual local inspection ("scouting") of existing crops in order to formulate a prescription request. Prescriptions received from the processing center, as described below, are loaded onto a media transfer device, such as PCMICA cards 5 that are inserted into a controller 7 which controls a spray rig 9, based on the prescription and on GPS signals transmitted from a GPS system 8 and received by GPS receiver 6. The process and apparatus are described in greater detail hereinafter.

Figure 2:
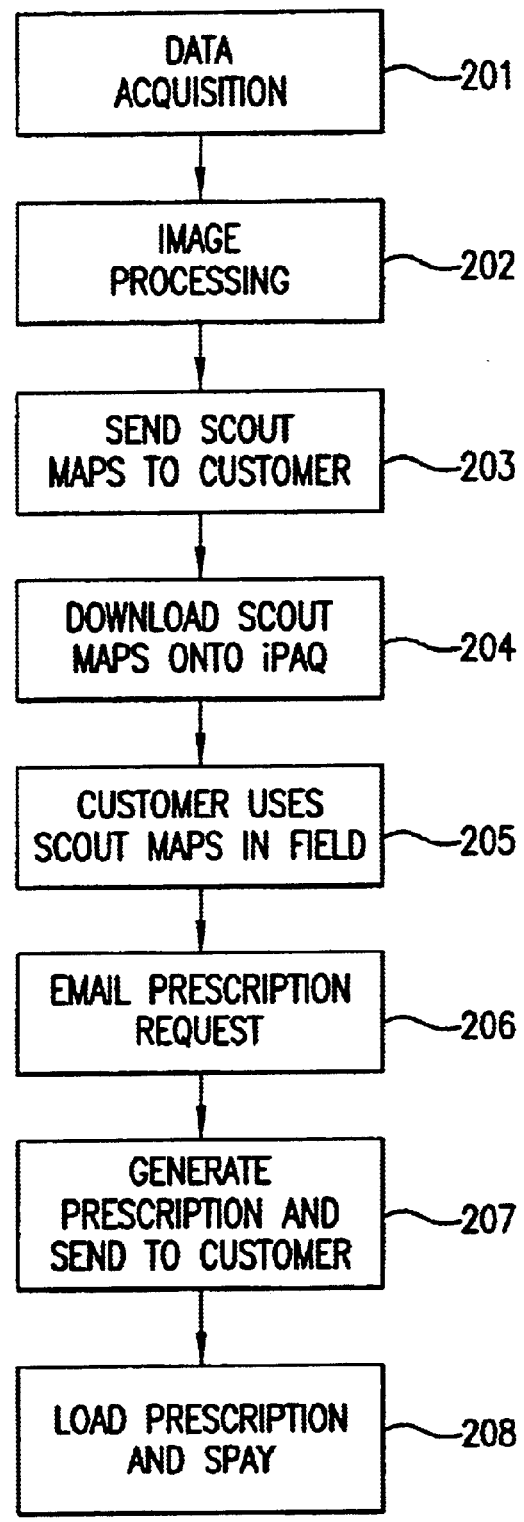
FIG. 2 is a flow chart that illustrates the variable rate application process implemented by the invention.

As shown in FIG. 2, in step 201, spectral image data are collected by satellite or aircraft flying over the customers area of interest. Aircraft data may be collected, for example, from an aircraft based sensor flying over an agriculture field. (Many such sensors are suitable for this purpose. One example is an RDACS sensor, but the invention is not limited to the use of any particular sensor.) The sensor stores the information in frames, each of which contains a plurality of frequency bands. For example, in one embodiment each frame has four bands: a band collecting data from the green region of the light spectrum at 540 nanometers, two bands collecting data from the red region of the light spectrum at 675 and 695 nanometers and a band collecting data from the infrared region of the light spectrum at 840 nanometers. Each frame contains columns and rows of pixels (for example, 1320 columns and 1035 rows), and there is geographic overlap from frame to frame. The amount of overlap is governed by the speed of the aircraft and the distance between flight lines. The image frames are written to any suitable storage medium, such as 8 mm or other tape, disks, etc.

The storage medium may be delivered to the processing facility on the day of the mission or by next day delivery via air courier. Alternatively, data may be transmitted from the aircraft to the processing center electronically. Satellite data may be purchased from an appropriate supplier and delivered either electronically or by next day delivery via air courier.

When the raw image data are received at the processing center, they are processed (Step 202) to place them in a form which is useable by farm personnel. It is useful to classify this process into two stages: pre-processing and processing. Pre-Processing Steps.

Depending on the type of instrument by which the data were collected the pre-processing steps may include, for example, georectification, masking and data export. These pre-processing steps include manual tasks and also automated tasks. The output of the pre-processing tasks provides calibrated output files that are cropped to the field boundaries. The following is an example of preprocessing steps which may be performed depending on the type of sensor that is used to collect the data.

First, the data are written onto a disk, and a process is run to extract the second band of each frame, which is exported to TIFF format and stored in a gray scale image. The analyst uses these images to create a "Field-to-Frame" list, which pairs the fields with the frames that contain them, indexed by the order that they appear on the tape. Also, this inspection is used to determine the quality of the data. The three band images, stored in TIFF format, are extracted from the removable hard drive, and the frames are inspected to determine the image quality, and to verify that all of the necessary images are present.

Georectification. In the georectification process, the analyst picks control points between the raw frames and the reference image of the research area. The reference image is stored in the UTM coordinate system, which locates exactly where any pixel of the reference image is on the earth. By picking control points and transforming the raw data to this same coordinate system, each pixel in the image frame can be located by its UTM location. This manual georectification process is performed on all the frames that contain the fields.

Exporting. After georeferencing is completed, the image frames, if necessary, are exported to a data format that can be read by the software. The most common format is GeoTIFF.

Processing Steps

After pre-processing is completed, the data must be transformed into a form that will allow farm management decisions to be made. In a preferred embodiment of the invention, this information may be a Normalized Difference Vegetation Index (NDVI), or any other Vegetation Index which shows spatial variation of the crop vigor of the plant. Each pre-processed field data file needs to be transformed into an NDVI image; and other information products need to be generated to support the use of the data in the experiment.

Creation of Vegetation Index Images. After pre-processing is completed, a polygon field boundary is used to mask out the field images. A software program is then used to loop through these input files to automatically generate the vegetation indices and other data files. This image is stored as a floating-point binary raster. In a preferred embodiment, the NDVI index is used.

Figure 3:
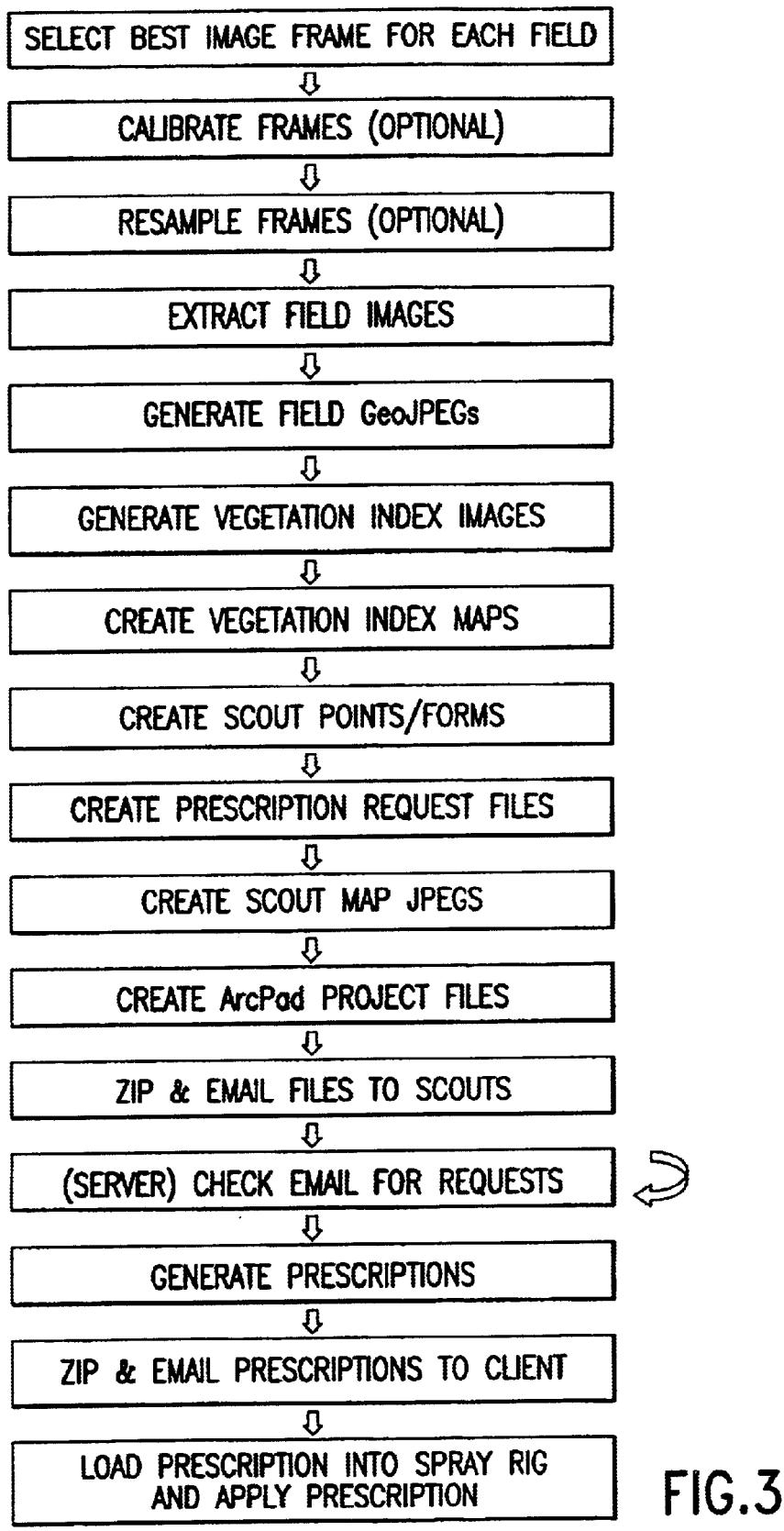
FIG. 3 is a flow chart that shows the processing steps performed by processing software that generates "prescriptions" to control application of agricultural chemicals automatically.
Figure 4A:
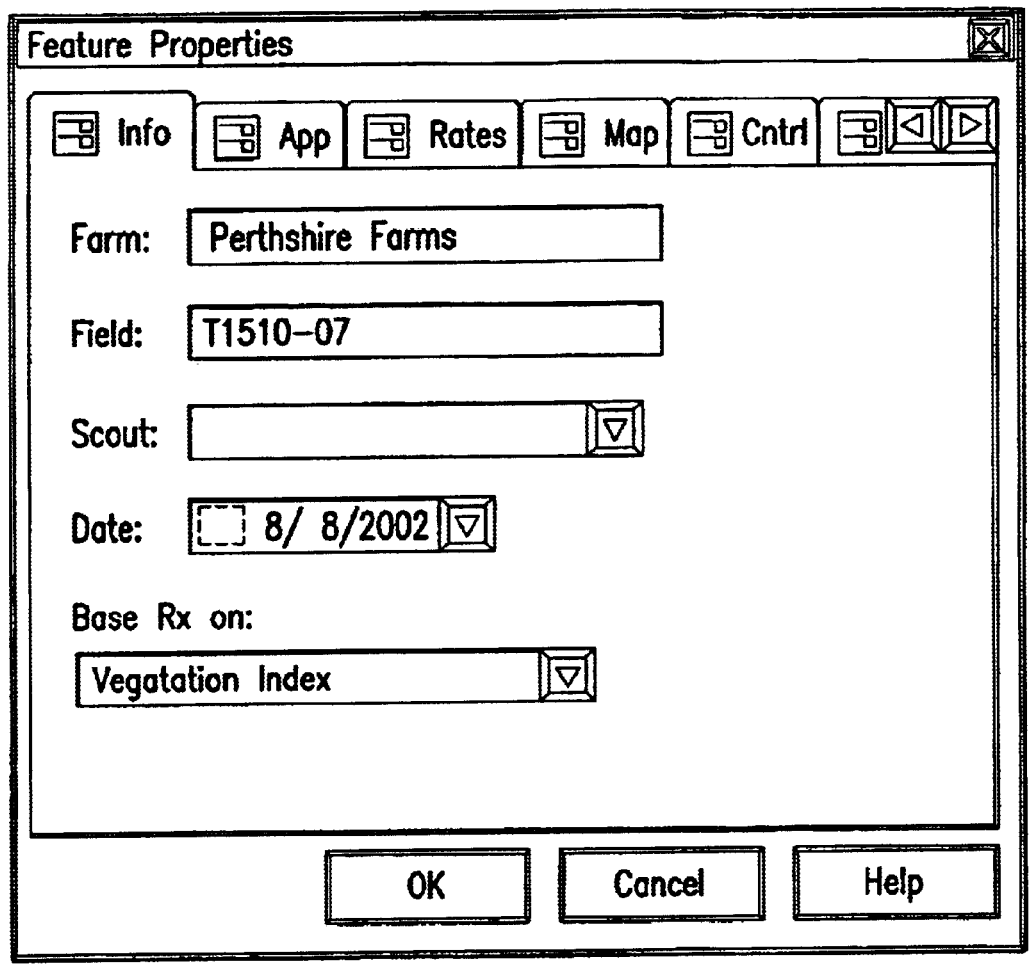
FIGS. 4a–e illustrates the manner of entry of information for submitting a prescription request form.
Figure 4B:
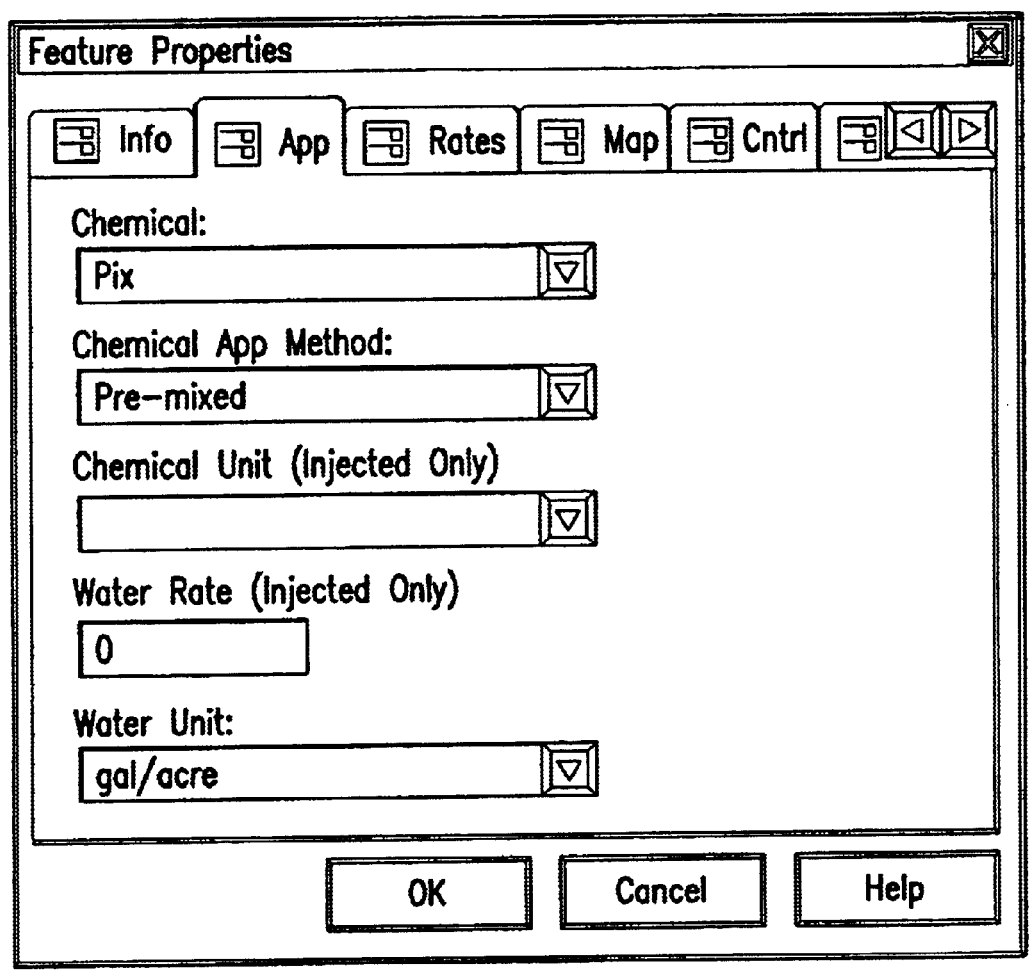
Figure 4C:
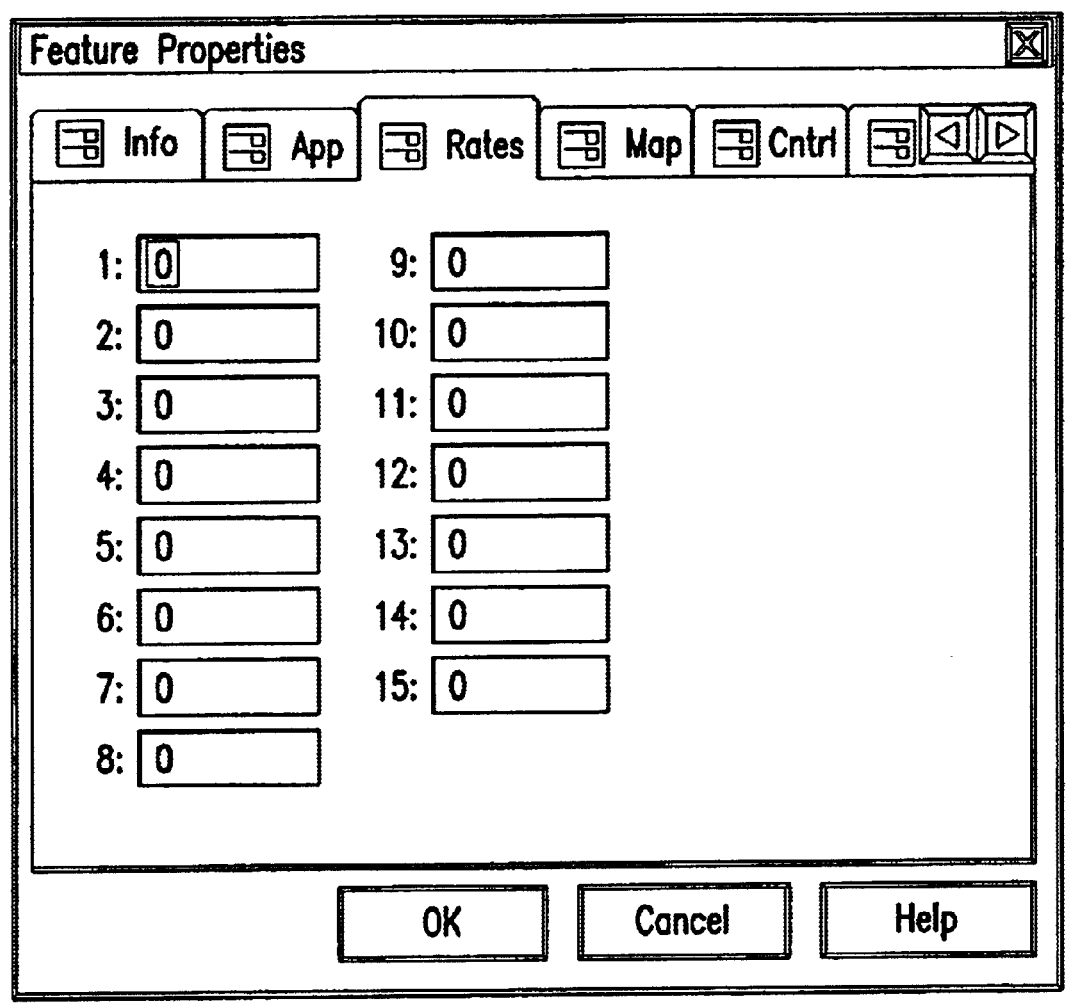
Figure 4D:
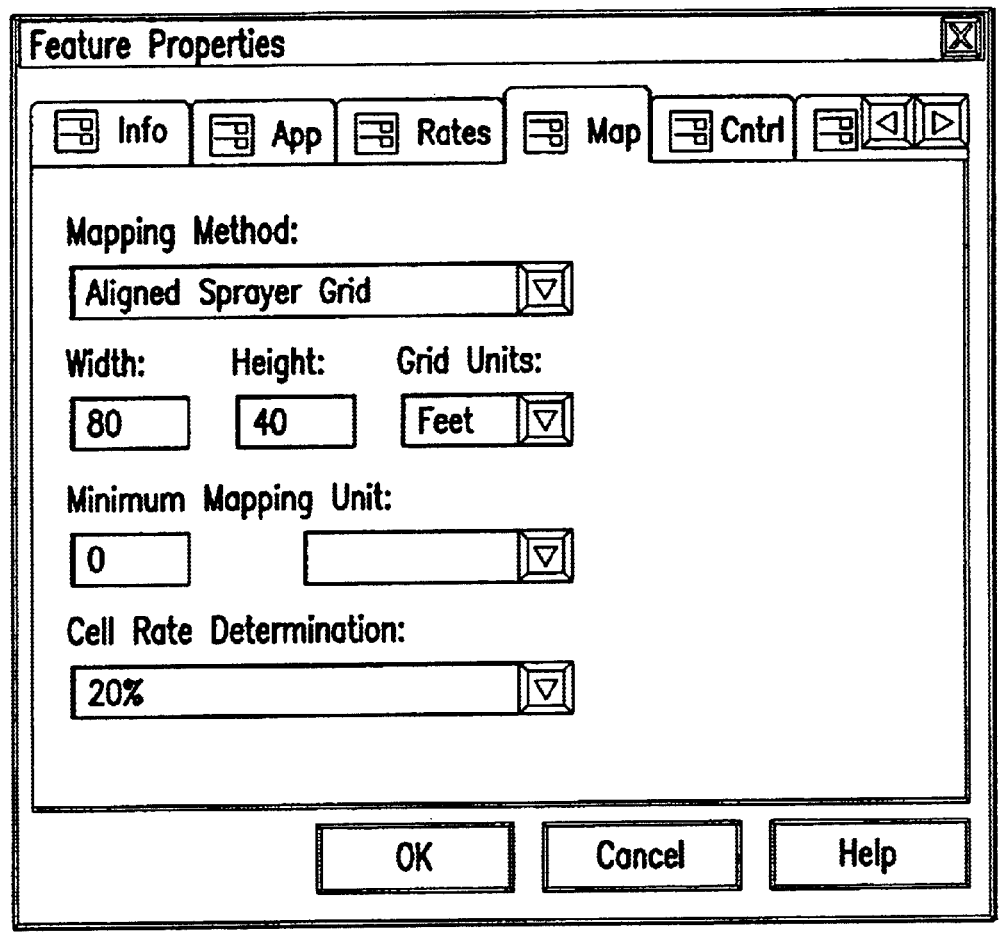
Figure 4E:
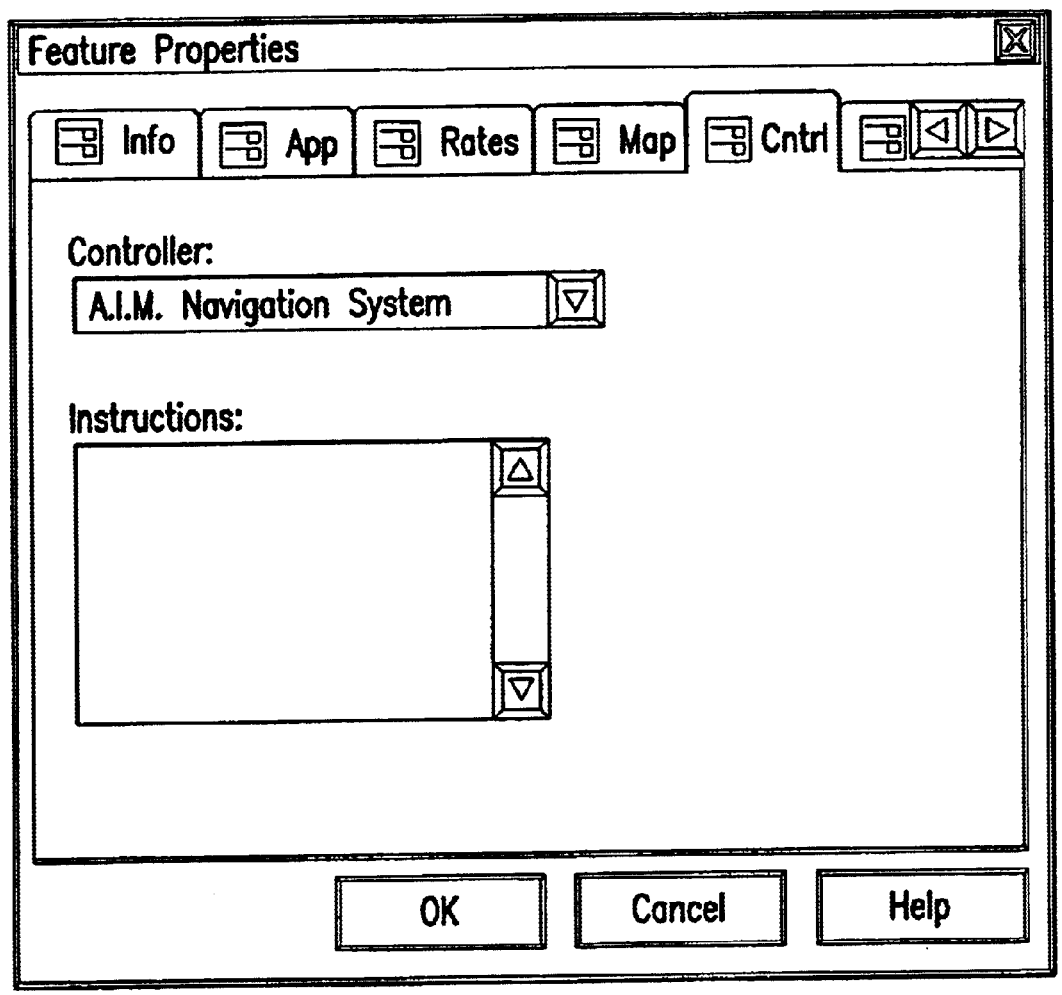

FIG. 3 is a flow chart that shows the steps performed by a software program by which the user can view vegetation index maps, display field data points and request field prescriptions.

Creation of Scout Files. An ArcPad™ project and related set of files are created to allow crop condition (including e.g., insect) scouting and prescription requests. These "scout" files are run on a GPS-equipped hand-held computer (such as Compaq iPAQ™), and can be used by on site farm personnel to "scout" existing vegetation conditions and formulate a prescription request. Some or all of the following files may be included:

a. NDVI Change Image. This delineates positive and negative vegetation changes from flight to flight.
b. Hardcopy maps of the above. These are created as JPEG images and display the multispectral image and the selected NDVI for each field.
c. Prescription Request Table. This is an on-line tabular request form, which allows the user to create variable-rate prescription requests based on the NDVI images described above. (See FIG. 4.) Chemical rates are set for each of the classes.
d. Scouting GoTo Points. These points are randomly selected by NDVI class or may be flagged waypoints.

Following data pre-processing and processing, the resultant "scout maps" are emailed to the farm, as shown in Step 203. They are then downloaded at the farm and loaded onto the farmer's handheld computer (step 204) to conduct the necessary field (scouting) work. This is done simply by inputting the scout maps into the local iCrop or other suitable software already loaded onto the iPAQ or computer at the customer's facility. The scouts load the shapefiles onto the iPaq handheld computer and use the hard copy and electronic imagery and "goto" points to detect the location of collecting field measurements. That is, the scout navigates to each of these points using known position determination techniques, and records insect, plant and other data. These data are used to help decide whether a chemical application (e.g., insecticide) is warranted, and if so, where and how much should be applied (Step 205).

If a prescription is needed, the scout determines what NDVI levels need to be included for each class in the scout map, and fills out a prescription request form (FIG. 4) indicating which NDVI levels should be sprayed. (See FIGS. 4a–e.) These parameters are then translated into a prescription request that is then e-mailed to the processing center via email or FTP (Step 206).

The iCrop software monitors the email on a regular basis and when a prescription request table is received, prescriptions are generated (Step 207) and then returned to the farm via email. The process is automated and the turnaround time can be as little as approximately 3 minutes using currently available technology. As used herein, the term "prescription" means a set of instructions in a file format that can be read by the controller 7 (FIG. 1), which causes the spray rig to implement the application rates and distribution as requested by the farmer. If sufficient processing capacity is available on site, step 206 may be eliminated, and the prescription itself generated locally (on site at the farm).

Once the prescriptions are received at the farm they are loaded onto PCMICA cards that are then inserted directly into the controller on the spray rig that directly applies the inputs to the field (Step 208).

FIGS. 5.a–d show examples of image files generated according to the invention. FIG. 5.a is a spectral composite image that is used to create a scout file 5.b. ("GoTo" points are not shown.) FIG. 5.c shows a prescription map, while FIG. 5.d shows the actual application of chemicals to a field. In the example illustrated in FIG. 5, a saving of 51% was achieved in terms of chemical expenditures, on a field of 157 acres.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for controlling application of agricultural inputs to a crop growing in a field, comprising:
   acquiring remotely sensed digital image data, in the absence of a pretreated reference portion of the field characterizing spatial variation of currently existing growth vigor of said crop; and
   applying said agricultural inputs to said crop at a spatially variable rate within said field, as a function of said currently existing growth vigor of said crop.

2. The method according to claim 1, further comprising:
   processing said digital image data to provide a data set comprising spatially distributed vegetation index data which characterizes current crop vigor throughout said field;
   inspecting current actual crop conditions at control points within said field and correlating observed crop conditions with corresponding data in said data set;
   generating a prescription based on said current observed crop conditions and said spatially distributed vegetation index data in said data set; and
   controlling application of said agricultural inputs according to said prescription.

3. The method according to claim 2, wherein said step of generating a prescription comprises:
   generating a prescription request as a function of said observed crop conditions and said spatially distributed vegetation index data in said data set;
   communicating said prescription request to a data processor at a data processing site; and
   said data processor generating said prescription, based on said prescription request and on said spatially distributed vegetation index data in said data set.

4. The method according to claim 3, wherein said data processing site is at a location remote from said field.

5. A method for controlling application of agricultural inputs to a crop growing in a field comprising:
   acquiring remotely sensed digital spectral data which characterizes currently existing conditions of said crop throughout said field, in the absence of a pretreated reference portion of the field;

processing said multispectral digital data to generate a digital map of said field, which map characterizes spatially differentiated existing growth vigor of said crop within said field; and applying agricultural inputs to said crop at an application rate which varies specially throughout said field as a function of spatially distributed current crop vigor based on information contained in said map.

6. The method according to claim 5, wherein said processing step comprises:

generating a data set comprising spatially distributed vegetation index data which characterizes said crop throughout said field;

entering said data set into a computer;

entering information into said computer that is indicative of observed crop conditions at selected locations within said field and correlating said information with data in said data set.

7. The method according to claim 6, further comprising:

generating a prescription request as a function of said observed crop conditions correlated with said spatially distributed vegetation index data in said data set;

communicating a prescription request to a data processor at a data processing site; and said data processor generating said prescription, based on a prescription request and on said data in said data set.

8. The method according to claim 7, wherein said data processing site is at a location remote from said field.

9. A system for application of agricultural inputs to a crop growing in a field, comprising:

means for obtaining digital image data that characterize spatial variation of currently existing growth vigor of said crop at a point in time in the absence of a pretreated reference portion of the field;

centrally located data processing means for processing said digital image data to provide a data set comprising spatially distributed vegetation index data which characterizes currently existing growth vigor of said crop throughout said field at said point in time, and for storing and communicating said data set; and a control unit which is programmed to control spatial variation of an application rate of said agricultural inputs by a spray rig, as a function of said currently existing growth vigor of said crop.

10. A method for controlling application of agricultural inputs to a field, comprising:

acquiring a first digital image data set characterizing spatial variation of growth vigor over said field, for a currently existing crop which is growing in said field, in the absence of a pretreated reference portion of the field;

processing said first digital image data set to generate a second data set comprising spatially distributed vegetation index data which characterize current growth vigor of said crop throughout said field, said second data set including at least a scout map identifying control points in said field;

transmitting said second data set to a computer unit situated in proximity to said field;

entering into said computer data characterizing currently existing growth vigor of said crop at said control points, based on a visual inspection of said control points;

said computer generating a prescription request, based on said second data set, said data based on visual inspection, and inputs from an operator of the computer;

transmitting said prescription request to said data processing site;

generating prescription in response to said prescription request; and loading said prescription into a controller of a spray rig, and controlling application of said agricultural inputs to said field, as a function of currently existing growth vigor of said crop.

11. A method for controlling application of agricultural inputs to a crop growing in a field, comprising:

acquiring near real time crop vigor data at at least one point in time during a growing season of said crop, said crop vigor data identifying current actual crop development of said crop, as of said at least one point in time during the growing season, in the absence of a pretreated reference portion of the field;

using said crop vigor data to generate at least one time variable and spatially variable dynamic crop prescription based on said actual crop development during said growing season; and controlling application of agricultural inputs to said cultivated grass during said growing season, to reflect said actual crop development.

* * * * *